G. RIGG.
FILTRATION OF FLUE DUST, FUME, AND LIKE FINE SOLID IMPURITIES FROM FURNACE GASES.
APPLICATION FILED JAN. 9, 1911.
1,095,676.
Patented May 5, 1914.
2 SHEETS—SHEET 1.
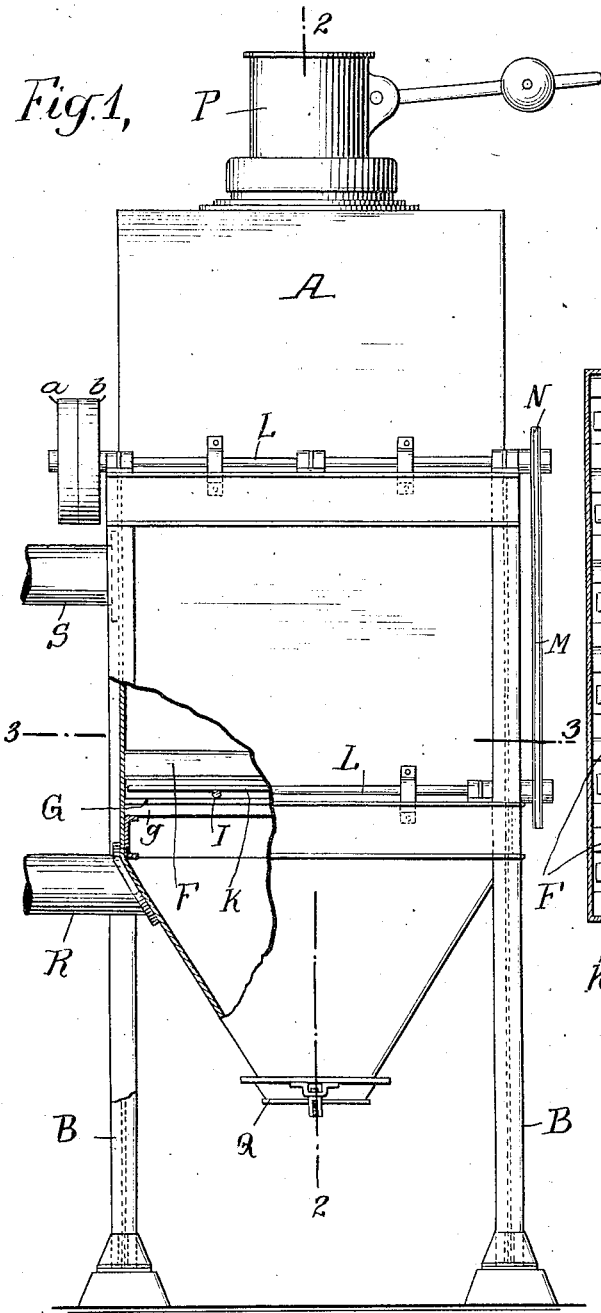
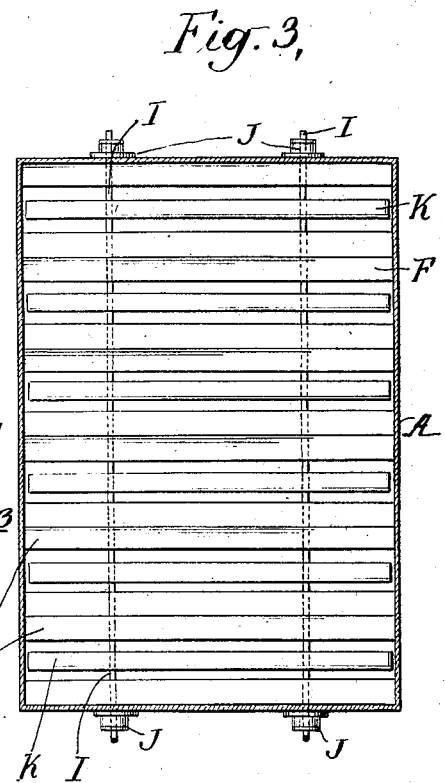
WITNESSES:
INVENTOR:
Gilbert Rigg,
BY
ATTORNEYS.

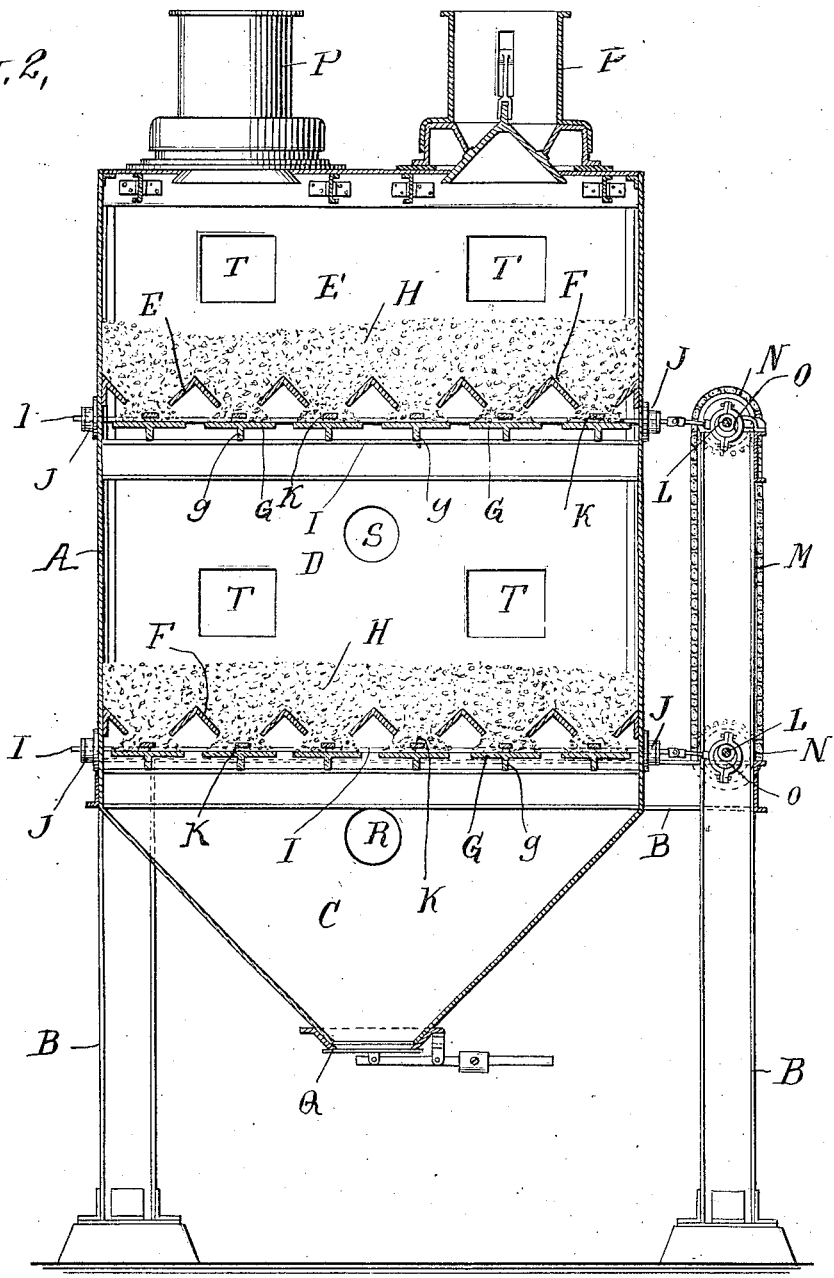

UNITED STATES PATENT OFFICE.

GILBERT RIGG, OF PALMERTON, PENNSYLVANIA, ASSIGNOR TO NEW JERSEY ZINC COMPANY, OF NEW YORK, N. Y., A CORPORATION OF NEW JERSEY.

FILTRATION OF FLUE-DUST, FUME, AND LIKE FINE SOLID IMPURITIES FROM FURNACE-GASES.

1,095,676.  Specification of Letters Patent.  Patented May 5, 1914.

Application filed January 9, 1911. Serial No. 601,555.

*To all whom it may concern:*

Be it known that I, GILBERT RIGG, a subject of the King of Great Britain, residing at Palmerton, county of Carbon, State of Pennsylvania, have invented certain new and useful Improvements in Filtration of Flue-Dust, Fume, and like Fine Solid Impurities from Furnace-Gases; and I do hereby declare the following to be a full, clear, and exact description of the invention, such as will enable others skilled in the art to which it appertains to make and use the same.

My invention relates to the arresting and filtering out from the gases of metallurgical furnaces of the fine solid impurities, sometimes designated as flue dust and fume, comprising products resulting from the conversion of a vapor into a soid in suspension in a gas, and sometimes accompanied by considerable percentages of other solids in such a fine condition of mechanical sub-division as to be practically indistinguishable from a fume.

Among the substances whose filtration from gases is contemplated by my invention may be specified, for instance, blue powder, consisting of zinc vapor converted, on cooling, into extremely finely divided metallic zinc; also vapors of zinc, lead, and manganese, undergoing oxidization and giving rise to fumes consisting of the oxids of those metals.

For effecting the filtration of gases containing these finely divided solid impurities, I make use of a body of relatively coarse material, such as small anthracite coal, coke, gravel, spiegel slag, oxid furnace cinder, broken stone, broken fire brick, or the like, preferably employing such sizes as will pass through a screen of one-half inch mesh and be retained upon a screen of one-quarter inch mesh. On entering this body of relatively coarse material, those portions of the solid impurities which are sufficiently fine adhere to the surface of the coarse material and to each other and build up porous accretions between the pieces of relatively coarse material, and these accretions act as the true filter for the gases.

To maintain substantially constant the efficiency of the filter, which would otherwise clog, owing to the increasing density of the accretions, and eventually block the passage of the gases, I provide means for progressively removing portions of the mass at the fouled zone thereof, and for supplying a like quantity of clean material at the zone where the gas in a filtered condition makes its exit. This is effected with the minimum amount of disturbance of the mass as a whole, and while maintaining practically unimpaired and uniform the efficiency of the constantly renewed filter zone.

In the accompanying drawings, Figure 1 represents, in side elevation, partly broken away, a structure and mechanism embodying the preferred form of my invention; Fig. 2 represents a vertical section thereof, on the line 2—2 of Fig. 1; Fig. 3 represents a horizontal section on the line 3—3 of Fig. 1.

Similar letters of reference indicate similar parts in both views.

Referring to the drawings, A indicates a housing supported upon suitable pedestals B. Upper and lower gratings divide the housing A into compartments C, D, and E. Each of these gratings consists of a series of bars F of inverted V-shape supported from opposite walls of the housing A, and of a series of flat bars G disposed at some distance below the spaces between the bars F and supported from the same walls of the housing. The bars G are preferably provided with strengthening ribs $g$ and are made sufficiently wide to support the material H at its angle of repose; therefore this material will be upheld by and remain stationary upon the gratings, if undisturbed. Above the bars G of each grating are the transverse rods I, which pass out of the housing A through stuffing boxes J. To these rods I is secured a series of rods K, each of which is directly above a corresponding member of the series of bars G and lies parallel therewith within the mass of the material H. Shafts L are journaled in the frame B at the levels of the gratings. One of these shafts is driven from any suitable source of power, and, for that purpose may be provided with the fast and loose pulleys $a$ $b$. Each shaft has fast upon it a sprocket N, and the sprockets are spanned by a sprocket chain M, so that the shafts L will move synchronously. Eccentrics O, mounted on the shafts L are connected to and serve to reciprocate the rods I, and the rods K attached thereto.

The housing A is provided, at its top, with hoppers P provided with suitable closures, and, at its bottom, with an outlet Q, also provided with a suitable closure, and doors T are provided for gaining access to the compartments D E, so as to charge the gratings with the initial layers of the material, and for replenishing it from time to time, and for cleaning. The gas to be filtered enters through the gas inlet pipe R into the compartment C and the filtered gas takes its exit from the compartment D through the outlet S.

The mode of the operation is as follows: The relatively coarse material H, of the kind referred to, is charged upon the gratings, to a depth indicated generally in Fig. 2, and the gases to be filtered are admitted to the compartment C, from which they pass upwardly into the material H supported on the lower grating, taking their way first through the portions of the material which rest directly upon the bars G and up through the spaces between the bars F to the compartment D, and thence out through the exit pipe S. In a short time, the porous accretions referred to build up within the coarse material upon the lower grating and produce an efficient filter. The densest portion of the filtering medium is formed in, at and within that portion of the coarse material lying upon the bars G, at the angle of repose. As soon as the porous accretions have collected in the lower zone of the material in such quantity as to interfere unnecessarily with the passage of the gases, the reciprocating rods K are brought into operation to compensate for the difficulty and to maintain the efficiency of the filter. To this end, the shafts L, through the cams or eccentrics O, impart a slight reciprocating movement to the rods K. These rods, moving within the mass resting upon the bars G, thereupon cause the outer surfaces of the fouled zone of the filter to slip off the edges of the bars G and down into the hopper bottom of the compartment C, from which it may be ultimately removed and screened or otherwise cleaned for re-use. At the same time, an equal amount of fresh material has been dropped from the upper grating, in the same way, and added to the upper surface of the material on the lower grating so as to compensate for the loss.

The pressure of the gas in the compartment C increases as the filter tends to become clogged, and this condition may be usefully employed by having in communication with the compartment C, any suitable pressure regulator, which, actuated by the pressure within said compartment, may be used to start the reciprocation of the rods K, as, for instance, by shifting the driving belt from the idle pulley to the fixed pulley of the upper shaft L. This feature, however, may be entirely dispensed with and the reciprocating rods K may be set in operation by the attendant workman, at intervals, and for the lengths of time that he finds by experience to be necessary to keep the filter in proper condition for effective filtration. In some instances, where the conditions are particularly favorable, the reciprocation of the rods K may be made continuous, especially where the flow of gas is of practically uniform speed and volume and carries a practically uniform quantity of fume or the like.

What I claim is:

1. The method of filtering gases carrying flue dust, fume and like fine solid impurities, which consists in passing said gases through a layer of coarse material until an efficient filter is formed within the coarse material by porous accretions of the said solid impurities therein, and maintaining the desired conditions of efficiency by removing portions of the entrance zone for the gases as said portions tend to become unnecessarily clogged; substantially as described.

2. The method of filtering gases carrying flue dust, fume and like fine solid impurities, which consists in passing said gases through a layer of coarse material until an efficient filter is formed within the coarse material by porous accretions of the said solid impurities therein, maintaining the desired conditions of efficiency by removing portions of the entrance zone for the gases as said portions tend to become unnecessarily clogged and adding fresh coarse material to the gas-exit side of the layer; substantially as described.

3. The method of filtering gases carrying flue dust, fume and like fine solid impurities, which consists in establishing two bodies of coarse material, one above the other, passing the gases upwardly through one of said bodies until an efficient filter is formed therein by porous accretions of the said solid impurities therein, removing portion of the bottom zone of the lower body of coarse material as it tends to become unnecessarily clogged, and adding fresh coarse material from the upper body to the upper surface of the lower body so as to keep the depth of the lower body substantially constant; substantially as described.

4. A gas filter, comprising a containing receptacle, a filter consisting of a single layer of coarse material supported therein across and above an open space through which removed portions of its lower zone may drop freely by gravity, a gas inlet opening below the filter layer, means for removing portions of the lower zone of the filter layer without materially disturbing the main body portion of said single layer, and means for replenishing the filter layer at its upper surface; substantially as described.

5. A gas filter, comprising a containing receptacle, a filter consisting of a single layer of coarse material located therein, a grating for the support of said filter layer, said grating consisting of an upper series of stationary bars of inverted V-shape spaced apart from each other, a corresponding lower series of supporting bars located below the interspaces of the upper series, and means for discharging portions of the layers from said lower series of bars without materially disturbing the main body portion of the coarse material above; substantially as described.

6. A gas filter, comprising a containing receptacle, a filter consisting of a single layer of coarse material located therein, a grading for the support of said filter layer, said grating consisting of an upper series of stationary bars of inverted V-shape spaced apart from each other, a corresponding lower series of supporting bars located below the interspaces of the upper series, and means for discharging portions of the layers from said lower series of bars; substantially as described.

7. A gas filter, comprising a containing receptacle, a filter layer of coarse material located therein, a grating for the support of said filter layer, said grating consisting of an upper series of stationary bars of inverted V-shape spaced apart from each other, a corresponding lower series of supporting bars located below the interspaces of the upper series, and means for discharging portions of the layers from said lower series of bars, said means consisting of a series of reciprocating rods located in the filter layer immediately above the lower series of stationary bars; substantially as described.

8. A gas filter, comprising a containing receptacle, a filter layer of coarse material contained therein, an upper replenishing layer of coarse material likewise located therein, a gas inlet entering the containing receptacle below the filter layer, a gas outlet issuing from the containing receptacle between the two layers, and gratings for each of the said layers, said gratings consisting of a series of stationary inverted V-shaped bars spaced apart from each other, a lower series of stationary supporting bars located below the interspaces of the V-shaped bars, and a series of reciprocating rods located in the coarse material immediately above the lower series of stationary bars, and mechanism for simultaneously actuating the reciprocating bars of the upper and lower layers; substantially as described.

9. In a gas filter, a filter layer of coarse material, a series of stationary supporting shelf-bars upon which the lower zone of said layer is supported with lateral surfaces exposed at the angle of repose to the up-flow of the gas to be filtered, an upper series of bars to direct the material toward and upon the shelf-bars, and means operating immediately above the stationary shelf-bars for effecting a fall of portions of the coarse material from the shelf-bars; substantially as described.

In testimony whereof I affix my signature, in presence of two witnesses.

GILBERT RIGG.

Witnesses:
F. LAYAT,
E. G. TACY.